No. 889,764. PATENTED JUNE 2, 1908.
T. W. CROZIER.
NUT LOCK.
APPLICATION FILED FEB. 29, 1908.

Witnesses

Inventor
Thomas W. Crozier.
By
Attorneys

UNITED STATES PATENT OFFICE.

THOMAS WASHINGTON CROZIER, OF CHRISTIANSBURG, VIRGINIA, ASSIGNOR OF ONE-FOURTH TO GEORGE W. MITCHELL AND ONE-FOURTH TO WILLIAM WALL, OF CHRISTIANSBURG, VIRGINIA.

NUT-LOCK.

No. 889,764.  Specification of Letters Patent.  Patented June 2, 1908.

Application filed February 29, 1908. Serial No. 418,502.

*To all whom it may concern:*

Be it known that I, THOMAS W. CROZIER, a citizen of the United States, residing at Christiansburg, in the county of Montgomery and State of Virginia, have invented a new and useful Nut-Lock, of which the following is a specification.

This invention relates to nut locks and more particularly to means whereby the bolt as well as the nut can be secured against rotation.

One of the objects of the invention is to provide a lock which will securely fasten the bolt and nut against relative movement without the necessity of providing either a bolt or a nut of special construction.

A further object is to provide locking means the efficiency of which is increased in proportion to the degree to which the nut is tightened, said means being designed to bite into the nut and bolt and thus act as a key to bind them together.

With these and other objects in view the invention consists of certain novel features of construction and combinations of parts which will be hereinafter more fully described and pointed out in the claims.

In the accompanying drawings is shown the preferred form of the invention.

Figure 1:
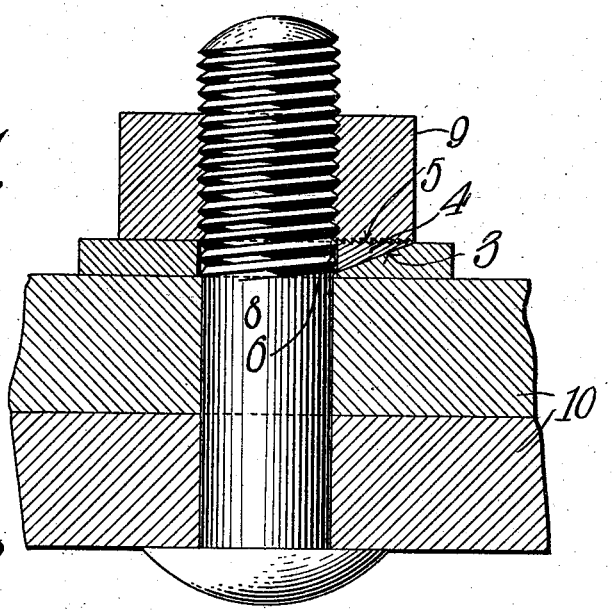
Figure 2:
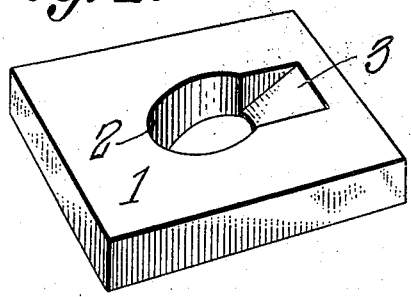
Figure 3:
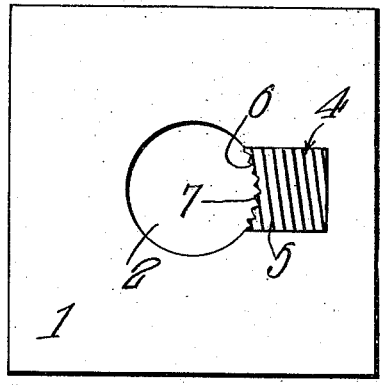
Figure 4:
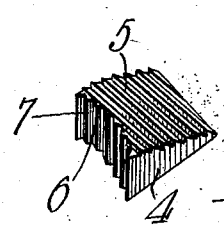

In said drawings: Figure 1 is a section through a nut lock embodying the present improvements. Fig. 2 is a perspective view of the washer of the lock. Fig. 3 is a plan view of said washer and showing the locking key positioned therein. Fig. 4 is a detail view of said key.

Referring to the figures by characters of reference, 1 designates a washer of any desired contour and having a bolt opening 2 while one face of said washer is provided with a recess 3, the bottom of which is inclined relative to the face of the washer. This recess opens into the bolt opening and constitutes a seat for a locking key consisting of a wedge-like lock 4, the bottom of which is smooth and designed to bear against the bottom of the recess 3 while the top of said key has teeth 5 extending backward thereacross. The thick end of the block is concaved from side to side as indicated at 6 and provided with teeth 7 designed to project into the opening 2 when the key is in bolt engaging position.

As indicated in the drawings the teeth 7 are preferably V-shaped while each tooth 5 preferably has that face thereof nearest the teeth 7 perpendicular to the face of the key as indicated particularly in Fig. 1. A bolt of any ordinary construction has been indicated at 8 and a nut of the usual form has been designated at 9. When it is desired to secure the nut upon the bolt the washer 1 is placed upon the bolt after said bolt has been inserted through the parts 10 to be secured. The key 4 is then seated in recess 3 and the nut 9 screwed thereagainst. As the teeth 5 are arranged diagonally upon the outer face of the key the nut will move thereover without being engaged thereby to an objectionable extent and will at the same time force the key downward against the inclined bottom of the recess which will in turn deflect the key toward the bolt so that the teeth 7 will bite into the bolt. It will be apparent of course that the tighter the nut screws upon the bolt and against the key the more firmly said key will bite into the bolt. By reason of the peculiar disposition of the teeth 5 they will serve to engage the nut and prevent it from unscrewing from the bolt. It will thus be seen that by utilizing the washer 1 and key 4 nuts and bolts of ordinary construction can be securely locked together and prevented from rotating independently of each other.

What is claimed is:

1. A nut and bolt lock comprising a washer having a bolt receiving aperture and a recess in one face of the washer and opening into said aperture, and a key movable bodily in one direction within the recesses radially of the aperture, said key having toothed surfaces for projecting beyond the recessed face of the washer and into the bolt aperture respectively.

2. In a nut and bolt lock comprising a washer having a bolt receiving opening, one face of said washer having an angular recess with an inclined bottom, said recess opening into the bolt opening, and a wedge-like locking key movable bodily within the recess radially of the bolt opening and having teeth disposed to project into the bolt opening.

3. In a nut lock the combination with a washer having a bolt receiving opening therein, there being an angular recess in one face of the washer and communicating with said opening, the bottom wall of the recess being inclined; of a wedge-like key movable bodily within the recess radially of the opening and disposed to be deflected by the inclined wall into the opening, that end of the key movable into the opening being provided with bolt engaging teeth.

4. In a nut lock the combination with a washer having a bolt receiving opening, there being an angular recess in one face of the washer and communicating with said opening, the bottom wall of the recess being inclined; of a wedge-like key slidable bodily upon and disposed to be deflected longitudinally by said inclined wall, said key being movable bodily in one direction radially of the bolt opening and having teeth upon one end and one face for engagement with a bolt and nut respectively.

5. The combination with a bolt and a nut thereon; of a washer having an opening and mounted upon the bolt and having an angular recess in one face communicating with the bolt opening, said recess being provided with an inclined bottom wall, and a locking key movably mounted upon the inclined wall of the recess and having teeth for engagement with the bolt and nut respectively, said key being bodily movable in one direction radially of the bolt opening.

6. The combination with a bolt, and a washer thereon having a bolt opening, said washer having a recess in one face communicating with the bolt opening in the washer, the bottom wall of said recess being inclined; of a locking key slidably mounted upon the inclined wall of the recess, said key having bolt engaging teeth at one end and diagonally disposed nut engaging teeth upon one face, and a nut bearing against the key to shift it upon the inclined wall of the recess and into engagement with the bolt.

In testimony that I claim the foregoing as my own, I have hereto affixed my signature in the presence of two witnesses.

THOMAS WASHINGTON CROZIER.

Witnesses:
ARCHER P. JOHNSON,
R. I. ROOP.